United States Patent [19]

Kameda et al.

[11] Patent Number: 4,740,540
[45] Date of Patent: Apr. 26, 1988

[54] FIBER-REINFORCED RESOL-EPOXY-AMINE RESIN COMPOSITION MOLDING MATERIAL AND METHOD FOR PRODUCING SAME

[75] Inventors: Mamoru Kameda, Chiba; Masaru Furukawa, Ichihara; Nobuhiko Yamauchi, Izum-Ohtsu, all of Japan

[73] Assignee: Dainippon Ink and Chemicals, Inc., Tokyo, Japan

[21] Appl. No.: 931,973

[22] Filed: Nov. 24, 1986

Related U.S. Application Data

[63] Continuation of Ser. No. 742,458, Jun. 7, 1985, abandoned.

[30] Foreign Application Priority Data

Jun. 8, 1984 [JP] Japan ................................ 59-116527

[51] Int. Cl.$^4$ ............................................. C08L 63/00
[52] U.S. Cl. ..................................... 523/457; 427/386; 427/389.7; 427/393.5; 523/466; 523/468; 525/423; 525/481; 525/486

[58] Field of Search ............... 525/486, 481, 423, 523; 523/457, 466, 468

[56] References Cited

U.S. PATENT DOCUMENTS 2,521,911  9/1950  Greenlee ............................... 525/486
4,440,914  4/1984  Helfand et al. ....................... 525/482
4,481,311  11/1984 Hesse et al. .......................... 523/424
4,611,036  9/1986  Sekiguchi et al. ................... 525/481

*Primary Examiner*—Theodore E. Pertilla
*Attorney, Agent, or Firm*—Sherman & Shalloway

[57] ABSTRACT

A resin composition for a molding material is provided which comprises a resol-type phenolic resin, an epoxy resin and an amine compound having hydrogen atoms directly bonded to the nitrogen atom. The amine compound is contained in such a proportion that the amount of its hydrogen atoms directly bonded to the nitrogen atom is 0.5 to 2.0 equivalents per equivalent of the epoxy groups of the epoxy resin.

17 Claims, No Drawings

FIBER-REINFORCED RESOL-EPOXY-AMINE RESIN COMPOSITION MOLDING MATERIAL AND METHOD FOR PRODUCING SAME

This application is a continuation of application Ser. No. 742,458 filed June 7, 1985, now abandoned.

This invention relates to a resin composition for a molding material comprising a resol-type phenolic resin, an epoxy resin and an amine compound.

Molding materials known heretofore include composite materials composed of condensation resins such as epoxy resins, unsaturated polyester resins, phenolic resins and polyimide resins or thermoplastic resins such as polyamides and polyacetal as a matrix resin and carbon fibers, aromatic aramide fibers, glass fibers, etc. as reinforcing fibers. Among them, a combination of a unidirectional sheet or nonwoven fabric or woven fabric of the reinforcing fibers with an epoxy resin is known to give a composite material of high strength. Since, however, it is likely that this type of composite material will cause human accidents owing to smoking in the event of fire when it is used for interior trimming of tall buildings and vehicles where windows are non-openable, it has recently been desired to replace it by a low-smoking composite material.

The use of a phenolic resin as the matrix resin is best from the standpoint of reduced smoking. A molding material comprising the phenolic resin, however, has much inferior strength, particularly interlaminar shear strength (ILSS), than a molding material comprising an epoxy resin, and also has low delamination strength when bonded to another material to provide a sandwich panel or the like. These defects are very detrimental to its practical application.

It is an object of this invention to provide a matrix resin and a molding material which can remedy these defects of the prior art.

The present inventors have found that a resin composition comprising (A) a resol-type phenolic resin, (B) an epoxy resin and (C) an amine compound having hydrogen atoms directly bonded to the nitrogen atom, the amine compound (C) being contained in such a proportion that the amount of said hydrogen atoms is 0.5 to 2.0 equivalents per equivalent of the epoxy groups of the epoxy resin (B), and a molding material obtained by impregnating the resin composition as a matrix resin into reinforcing fibers can achieve the object of this invention.

The molding material of this invention has higher strength than a molding material comprising a phenolic resin as a matrix, and its strength of bonding to other materials is on a practical level. Furthermore, the smoking of the molding material of this invention is much less than that of a molding material comprising an epoxy resin. It also has excellent moldability.

The main component of the resin composition of this invention is the resol-type phenolic resin (A), preferably a resol-type phenolic resin containing 0.5 to 2.0 moles of hydroxymethylene groups per mole of phenol. The resol-type phenolic resin (A) can be produced by reacting a phenol having the hydroxyl group directly bonded to the aromatic ring such as phenol, cresol, resorcinol, catechol, p-tertiary butyl phenol or p-tertiary butyl catechol with a compound capable of adding methylene groups, for example an aldehyde such as formaldedhyde, paraformaldehyde and trioxane or tetramine in the presence of an alkaline catalyst. Preferred phenolic resins are those in which the amount of hydroxymethylene groups directly bonded to the aromatic ring is 0.5 to 2.0 moles per mole of the aromatic ring. The hydroxymethylene groups in the resol-type phenolic resin are crosslinked during polymerization and are one of the factors which are conducive to reduced smoking. It is critical that the phenolic resin should contain these hydroxymethylene groups. If the amount of the hydroxymethylene groups is larger than 2.0 moles, the cross-linking density of the hydroxymethylene groups is high, and the resulting resin becomes hard and brittle upon polymerization. On the other hand, if it is less than 0.5 mole, smoking increases.

As the resol-type phenol resin (A), various commercial phenolic resins meeting the above requirements, for example a phenolic resin marketed under the trade name "PLYOPHEN" by Dainippon Ink and Chemicals, Inc., can be used.

The use of the resol-type phenolic resin (A) alone has lower ILSS than a conventional epoxy resin, and its delamination strength is not sufficient in bonding to another material. Hence, an epoxy group-containing oligomer, i.e. the epoxy resin (B), is used in combination in this invention.

Various types of epoxy resins containing at least 2 epoxy groups in the molecule, such as those of the bisphenol A, bisphenol F, novolac phenol and amine types can be used as the epoxy resin (B). As the epoxy equivalent of the epoxy resin becomes smaller, it has a higher crosslinking density and becomes harder. On the other hand, as its epoxy equivalent becomes higher, it has a lower crosslinking density and becomes softer. Accordingly, the suitable epoxy equivalent of the epoxy resin is usually 80 to 800, preferably 90 to 300. Needless to say, it may fall outside this range when it is desired to use a harder or softer matrix resin. Various epoxy resins, for example, one marketed under the trade name "EPICLON" by Dainippon Ink and Chemicals, Inc., can be used as the epoxy resin (B).

In the present invention, the proportions of the resol-type phenolic resin (A) and the epoxy resin (B) are such that the ratio of (A):(B) is 20–90 parts by weight: 80–10 parts by weight, preferably 30–85 parts by weight: 70–15 parts by weight.

The amine compound (C) having a hydrogen atom, preferably 3 to 5 hydrogen atoms, directly attached to the nitrogen atom is used together with the resol-type phenolic resin (A) and the epoxy resin (B) in the resin composition of this invention. Preferably, the amine compound (C) has a molecular weight of not more than 500. Any mono- or poly-amines which are normally used as curing agents for epoxy resins can be used in this invention. Examples include aromatic and aliphatic amines such as ethylenediamine, trimethylenediamine, diethylenetriamine, tetramethylenediamine, diaminodiphenylsulfone, dicyandiamide, glycidylamine, hexamethylenediamine and polyamide oligomers; imidazoles such as 2-phenyl-4-methyl-5-hydroxyimidazole and 2-phenyl-4,5-dihydroxymethylimidazole; hydantoins; and isocyanurates. When a molding material comprising the resin composition of this invention as a resin matrix is used in the B-stage (namely, as a so-called prepreg), amines such as diaminophenylsulfone and dicyandiamide are superior in that they have good storage stability and rapidly induce curing upon heating.

The use of the amine compound (C) increases the strength, particularly ILSS, of the composite material. The proportion of the amine compound (C) is such that the amount of its hydrogen atoms (usually active hydrogen atoms) directly bonded to the nitrogen atom is 0.5 to 2 equivalents, preferably 0.8 to 1.5 equivalents, per equivalent of the epoxy groups of the epoxy resin (B). If its amount is remote from this range, molded articles finally obtained have a low ILSS value (namely, they are susceptible to delamination under stresses) and inferior heat resistance.

To improve smoking property, the flow of the resin during molding and curing, the smoothness of the surface of a molded article, bondability to another material, and other properties, silica, calcium carbonate, magnesium oxide or other inorganic fillers may be incorporated into the resin composition of this invention. The amount of the inorganic filler is preferably 5 to 30% by weight, more preferably 10 to 20% by weight.

As required, a curing accelerator such as dichlorophenylurea, boron trifluoride derivatives and hydantoin derivatives may be added as required to the resin composition of this invention. The amount of the accelerator is preferably 0.5 to 8% by weight, more preferably 3 to 6% by weight.

The resin composition of this invention consists essentially of the phenolic resin (A), the epoxy resin (B) and the amine compound (C). These ingredients may be in the unreacted state, or may partly be reacted in advance.

The composition of this invention can be used to produce a molding material (FRP) by impregnating or mixing it in or with reinforcing fibers. The reinforcing fibers for giving such FRP are not limited in particular. There may be used fibers for so-called high performance composite materials, such as carbon fibers, aromatic polyamide fibers (aramide fibers), glass fibers, silicon carbide fibers and ceramic fibers. They may be in the form of short fibers or long fibers. To obtain high strength, it is preferred to use a woven fabric prepared from long fibers. A prepreg obtained by unidirectionally aligning long fibers (or woven or nonwoven fabrics), impregnating the resin composition of this invention in the resulting assembly of the fibers, and drying it to a B-stage is also a preferred embodiment of the molding material of this invention.

Because of reduced smoking and low cost, the glass fibers are best suited among the aforesaid reinforcing fibers. The carbon fibers, however, are superior in moduli of elasticity and strength properties such as tensile strength, tensile moduli of elasticity, flexural strength and flexural moduli of elasticity. The aramide fibers are suitable where high impact strength is required.

When the resin composition of this invention is used as a molding material, the content of the reinforcing fibers is usually about 30 to 90% by weight, preferably about 50 to 75% by weight. In this case, the preferred content of the resin composition in the molding material is 25 to 50% by weight. The molding material preferably contains 10 to 35% by weight of the resin composition because a molded article obtained by molding and curing the molding material is low smoking and retains practical strength.

The molding material in the form of a prepreg is produced in this invention generally by a method which comprises impregnating the resin composition in the reinforcing fibers, and then heat-treating the impregnated fibers at a temperature of usually 80° to 130° C., preferably 100° to 120° C., for 5 to 10 minutes to a B-stage. The heating conditions should be selected properly such that the resin is not completely cured.

In the production of the molding material in the form of a prepreg, the resin composition is used after its viscosity is adjusted to 5 to 1000 cps, preferably 5 to 200 cps, by using a solvent, for example water, dimethylacetamide, dimethylformamide, a ketone such as methyl ethyl ketone or acetone, an alcohol such as methanol and ethanol, ethyl acetate, Cellosolve, an ether, an aromatic hydrocarbon such as toluene or xylene, or a halogenated hydrocarbon such as methylene chloride and trichloroethylene. Preferably, the solvent has a boiling point below the temperature employed in preparing the B-stage molding material.

The prepreg is produced generally by impregnating reinforcing fibers such as a woven cloth of glass fibers or carbon fibers with the resin composition having the adjusted viscosity, and heating and drying the fibers to remove the solvent and convert the matrix resin to a B-stage resin.

The molding material of this invention can also be produced by hand layup. In this case, an amine compound having relatively high reactivity, for example ammonia or a polyamine having 1 to 6 carbon atoms such as ethylenediamine, triethylenediamine or diethylenediamine is preferred as the amine compound (C) having hydrogen atoms directly bonded to the nitrogen atom.

An amine compound having relatively low reactivity used in the production of the prepreg may be used in combination with an acid such as sulfuric acid, phosphoric acid, hydrochloric acid or nitric acid.

The prepregs may be molded by laying the required number of the prepregs one on top of another, and compressing them under heat and pressure, specifically at a temperature of 100° to 180° C., preferably 120° to 140° C., under a pressure of 0.1 to 0.9 atmosphere for vacuum forming and 1 to 200 atmospheres for other types of molding for a period of 5 minutes to 2 hours, preferably 8 to 30 minutes.

The molding material of this invention can be used for the production of sandwich panels having fire retardancy and thermal insulating property. Such a sandwich panel can be obtained, for example, by bonding the molding material to both surfaces of a honeycomb made of aluminum, paper or NOMEX (trade name), preferably a paper honeycomb, and curing the resin component of the molding material. Plastic foams such as foams of resolor novolac-type phenolic resin, various vinyl resins and epoxy resins may be filled in the inside cores of the honeycomb. Preferably, such foams are formed in situ in the cores simultaneously with the curing of the molding material of this invention.

The polyurethane foam may be obtained from a prepolymer (liquid) or oligomer (solid) containing 5 to 25% by weight of an isocyanate, a polyol, a blowing agent, etc.

The phenolic resin foam is a resol-type phenolic resin foam obtained from a resol-type phenolic resin, a blowing agent, a catalyst, etc., and a novolac-type foam obtained from a novolac-type phenolic resin, a blowing agent, etc.

The epoxy resin foam may be obtained from an epoxy resin, a curing agent, a blowing agent, etc.

The vinyl resin foam may be obtained from a vinyl resin such as vinyl chloride resin, an acrylic resin or a styrene resin, a blowing agent, etc.

The sandwich panel may be obtained by such a molding method as autoclave molding, vacuum forming or hot press forming.

The molding material of this invention is useful for the production of electrically insulating laminated plates, motor cases, heat-resistant housings, lattice frames, interior trimming decorative boards, interior trimming panels, parts used around engines of motor vehicles and ships, and other articles requiring heat resistance and flame resistance.

The following examples illustrate the present invention further. All parts in these examples are by weight.

EXAMPLE 1

Fifty parts of a resol-type phenolic resin containing 1.2 moles of hydroxymethylene groups per mole of phenol (R-501, a product of Dainippon Ink and Chemicals, Inc.) was mixed with 50 parts of a bisphenol A-type epoxy resin having an epoxy equivalent of 190 (a product of Dainippon Ink and Chemical, Inc.), 5.4 parts (one equivalent of active hydrogen per equivalent of the epoxy groups) of dicyandiamide and 3 parts of EPICLON B-6051M (accelerator, a product of Dainippon Ink and Chemicals, Inc.). The resulting resin composition was diluted to 20 centipoises with acetone. The diluted resin composition was impregnated in a glass cloth (SLS-213B, a product of Asahi Fiber Glass Co., Ltd.) having a basis weight of 300 g/m$^2$, and heat-treated to a B-stage to form a prepreg (500 g/m$^2$).

Fifteen such prepregs were piled, and heated at 130° C. under a pressure of 20 kg/cm$^2$ to cure the resin and form a laminate having a glass content of 80% by weight. The laminate had an interlaminar shear strength (ILSS) of 6.7 kg/mm$^2$.

Four such prepegs were formed into a laminate in the same way as above, and subjected to a smoking test in accordance with JIS-A-1321 (the coefficient of smoking was measured). After 4 minutes, it had a coefficient of smoking of 3.

The coefficient of smoking (per unit area) was calculated in accordance with the following equation.

$$\text{Coefficient of smoking} = 240 \log \frac{I_o}{I}$$

$I_o$: the intensity (lux) of light at the start of the heating test, $I$: the mimimum value of the intensity (lux) of light during the heating test.

The coefficient of smoking corresponds to the following classes of fire retardancy.

| Fire retardancy class | Coefficient of smoking after 4 minutes |
| --- | --- |
| 1 | not more than 30 |
| 2 | not more than 60 |
| 3 | not more than 120 |

EXAMPLE 2

Fifty parts of the same resol-type phenolic resin and 50 parts of the same epoxy resin having an epoxy equivalent of 190 as used in Example 1 were mixed with 14.5 parts of diaminodiphenylsulfone (1 equivalent of active hydrogen per equivalent of the epoxy groups of the epoxy resin). Using the resulting resin composition, a laminate was prepared in the same way as in Example 1. The laminate had an ILSS of 6.7 kg/cm$^2$ and a coefficient of smoking after 4 minutes of 3.

COMPARATIVE EXAMPLE 1

Fifty parts of bisphenol A-type epoxy resin having an epoxy equivalent of 190 (a product of Dainippon Ink and Chemicals, Inc.) was mixed with 50 parts of a fire-retardant brominated epoxy resin having an epoxy equivalent of 360 (a product of Dainippon Ink and Chemicals, Inc.), 8.4 parts of dicyandiamide and 3 parts of EPICLON 605IM as a curing accelerator. The resulting resin composition was diluted with 50 parts of acetone to a viscosity of 12 centipoises. The diluted resin composition was impregnated in glass cloths (SLS-213B), and dried at 100° C. in a dryer to convert the resin to a B-stage resin and obtain prepregs.

A laminate was prepared from the prepregs in the same way as in Example 1. It had an ILSS of 6.5 kg/mm$^2$ and a coefficient of smoking after 4 minutes of 200.

COMPARATIVE EXAMPLE 2

A laminate was prepared in the same way as in Example 1 except that in the preparation of the resin composition, the amount of dicyandiamide was changed to 1.6 parts (about 0.3 equivalent of active hydrogen per equivalent of the epoxy resins). The resulting laminate had an ILSS of 4.3 kg/mm$^2$, which was much lower than that of the laminate obtained in Example 1, and a coefficient of smoking after 4 minutes of 4.

COMPARATIVE EXAMPLE 3

A laminate was prepared in the same way as in Example 1 except that in the preparation of the resin compositions, 50 parts of a novolak-type phenolic resin (PLYOPHEN LF7911, a product of Dainippon Ink and Chemicals, Inc.) was used instead of 50 parts of the resol-type phenolic resin used in Example 1. The resulting laminate had an ILSS of 5.6 kg/mm$^2$, and a coefficient of smoking after 4 minutes of 130.

EXAMPLE 3

A laminate was prepared in the same way as in Example 2 except that in the preparation of the resin composition, 20 parts of talc was further added, and the resulting resin composition was diluted with acetone to a viscosity of 40 centipoises. The resulting laminate had an ILSS of 6.3 kg/mm$^2$ and a coefficient of smoking after 4 minutes of 2.

EXAMPLE 4

Two prepregs, 15 cm×15 cm, prepared in Example 1 were laid up, and compressed by a hot press at a temperature of 140° C. and a pressure of 30 kg/cm$^2$ for 1 hour to prepare a cured surface material having a thickness of 0.3 mm.

The surface material was cut to a size of 10 cm×10 cm, and placed on the under surface of a hot press. One prepreg, 10 cm×10 cm in size, was placed on it as an adhesive sheet. A paper honeycomb having a cell size of 8 mm, a thickness of 10 mm, a plane size of 10 cm×10 cm and a weight of 5 g was placed on the adhesive sheet. One prepreg, the same as stated above, was placed on it further, and the same surface material as above was placed on it. The entire assembly was then compressed at a temperature of 150° C. and a pressure of 1 kg/cm$^2$.

The resulting panel had a flexural strength of 14 kg/mm$^2$.

What is claimed is:

1. A molding material composed of a resin composition and reinforcing fibers, said resin composition comprising a resol-type phenolic resin having hydroxymethylene groups directly bonded to the aromatic ring, an epoxy resin containing at least two epoxy groups in the molecule and an amine compound having hydrogen atoms directly bonded to the nitrogen atom which is selected from the group consisting of an aromatic amine, dicyandiamide, glycidylamine, imidazole, and hydantoin, said amine compound being contained in such a proportion that the amount of its hydrogen atoms corresponds to 0.5 to 2.0 equivalents per equivalent of the epoxy groups of the epoxy resin.

2. The molding material of claim 1 wherein the resol-type phenolic resin contains 0.5 to 2.0 moles of hydroxymethylene groups per mole of phenol.

3. The molding material of claim 1 wherein the epoxy resin has an epoxy equivalent of 80 to 800.

4. The molding material of claim 1 wherein the amine compound has 3 to 5 hydrogen atoms directly bonded to the nitrogen atom.

5. The molding material of claim 1 wherein the resin compositions comprises 20 to 90 parts by weight of the resol-type phenolic resin and 80 to 10 parts by weight of the epoxy resin.

6. The molding material of claim 1 which contains 30 to 90% by weight of the reinforcing fibers.

7. The molding material of claim 1 wherein the reinforcing fibers are carbon fibers, aramide fibers or glass fibers.

8. The molding material of claim 1 wherein the amine compound is diaminodiphenylsulfone, dicyandiamide, diaminodiphenylmethane or imidazole.

9. A method for producing a molding material in the form of a prepreg, which comprises impregnating reinforcing fibers with a resin composition comprising a resol-type phenolic resin having hydroxymethylene groups directly bonded to the aromatic ring, an epoxy resin containing at least two epoxy groups in the molecule and an amine compound having hydrogen atoms directly bonded to the nitrogen atom which is selected from the group consisting of an aromatic amine, dicyandiamide, glycidylamine, imidazole, and hydantoin, said amine compound being contained in such a proportion that the amount of its hydrogen atoms corresponds to 0.5 to 2.0 equivalents per equivalent of the epoxy groups of the epoxy resin; and then converting the resin to a B-stage resin.

10. The method of claim 9 wherein the amine compound is diaminodiphenylsulfone, dicyandiamide or diaminodiphenylmethane.

11. The molding material of claim 1 wherein the epoxy resin has an epoxy equivalent of 90 to 300.

12. The molding material of claim 1 which comprises 30 to 85 parts by weight of the resol-type phenolic resin and 70 to 15 parts by weight of the epoxy resin.

13. The molding material of claim 1 wherein the amine compound is diaminodiphenylsulfone or dicyandiamide.

14. The molding material of claim 1 wherein the amine compound is contained in such a proportion that the amount of its hydrogen atoms corresponds to 0.8 to 1.5 equivalents, per equivalent of the epoxy groups of the epoxy resin.

15. The molding material of claim 1 which further comprises from about 5 to 30% by weight of an inorganic filler.

16. The molding material of claim 15 wherein the inorganic filler is selected from the group consisting of silica, calcium carbonate, and magnesium oxide.

17. The molding material of claim 1 which contains from about 50 to 75% by weight of the reinforcing fibers.

* * * * *